UNITED STATES PATENT OFFICE.

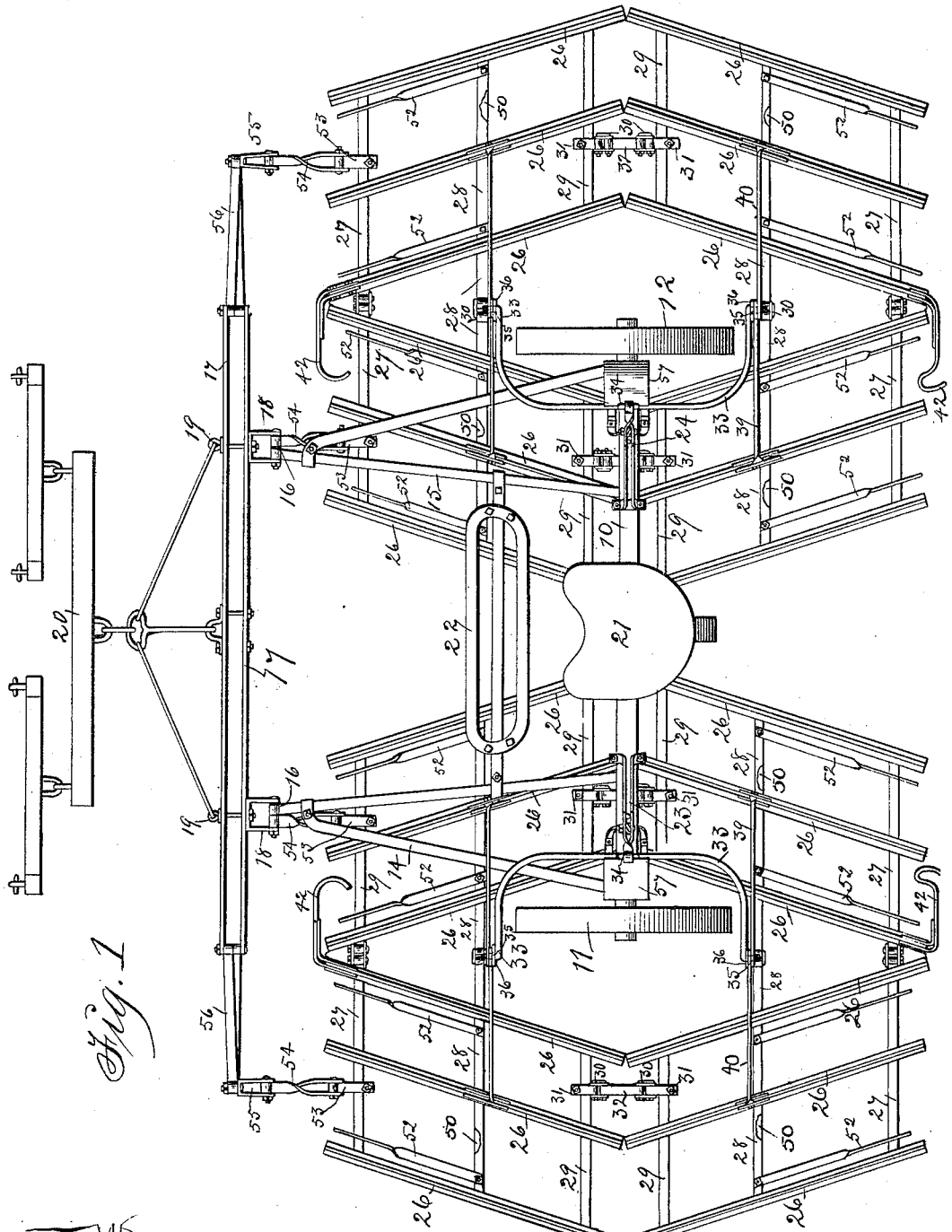

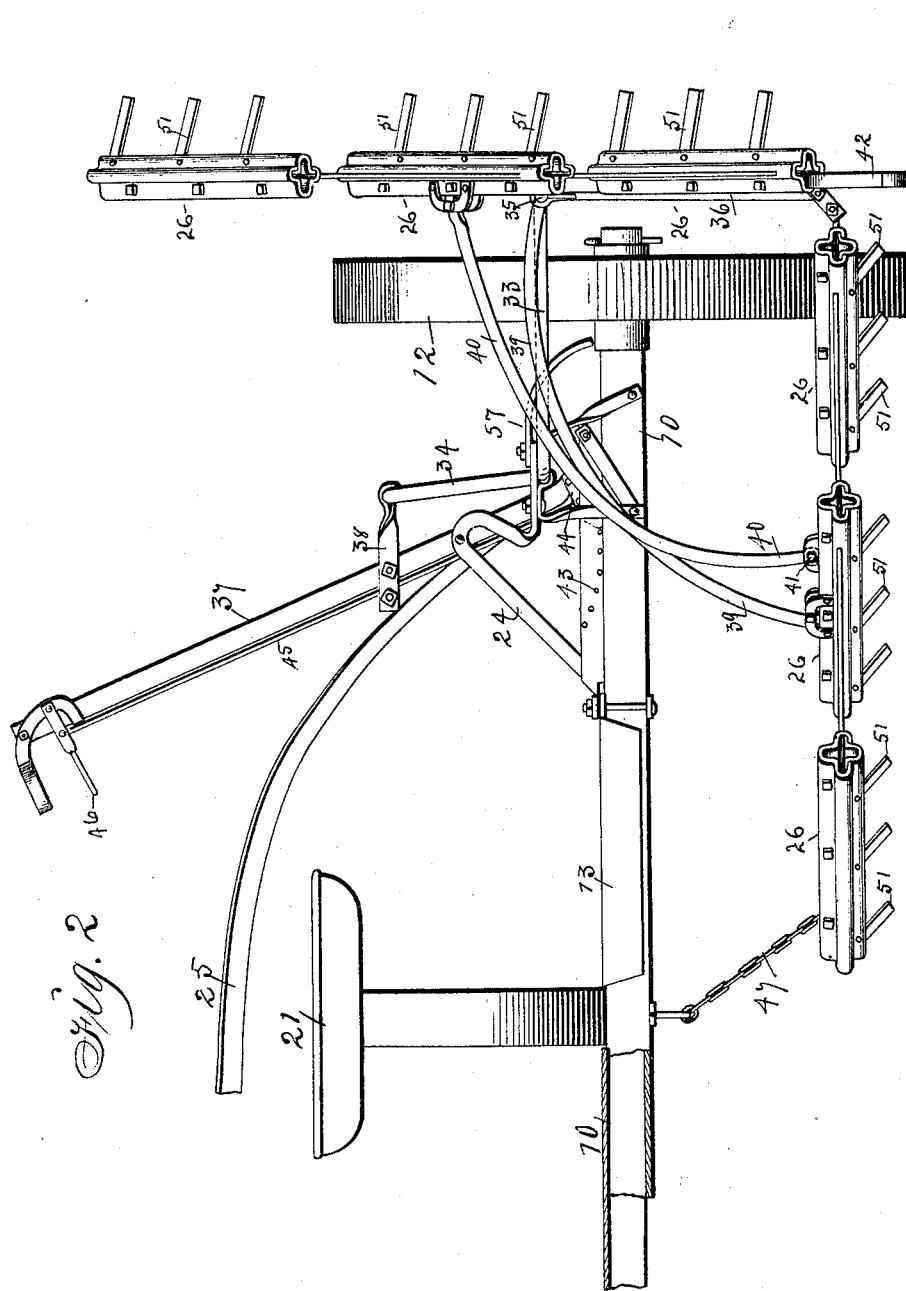

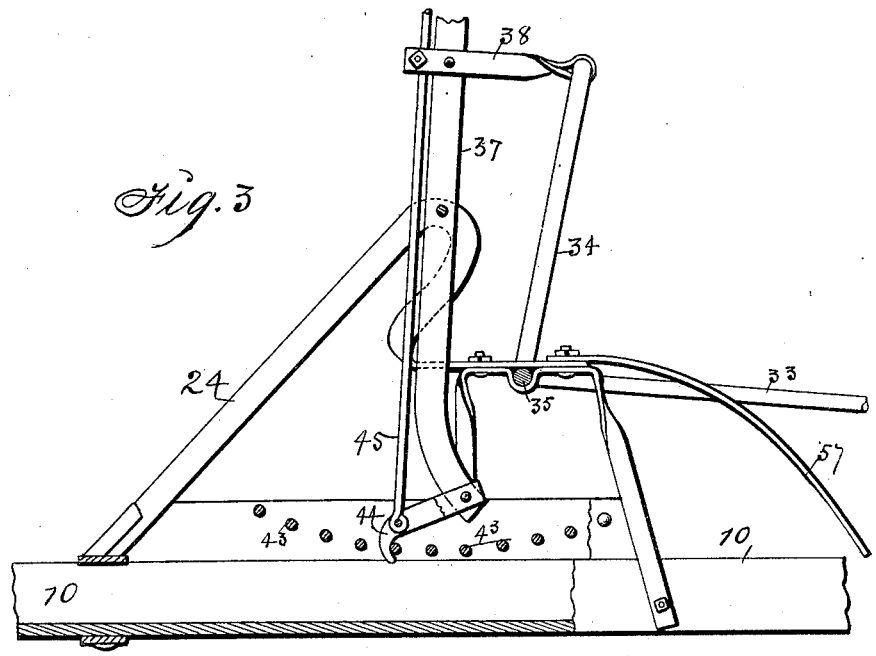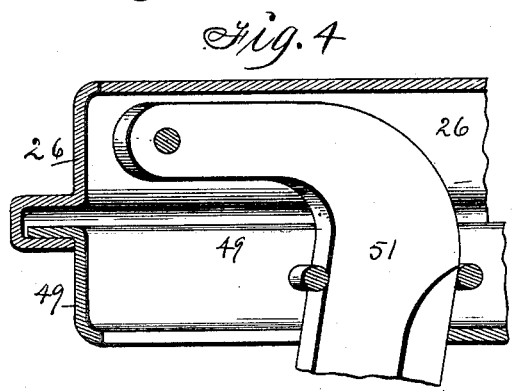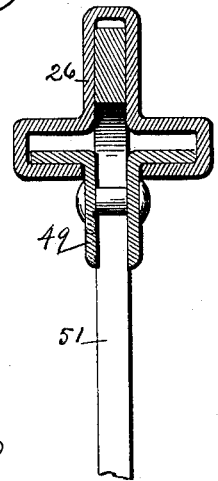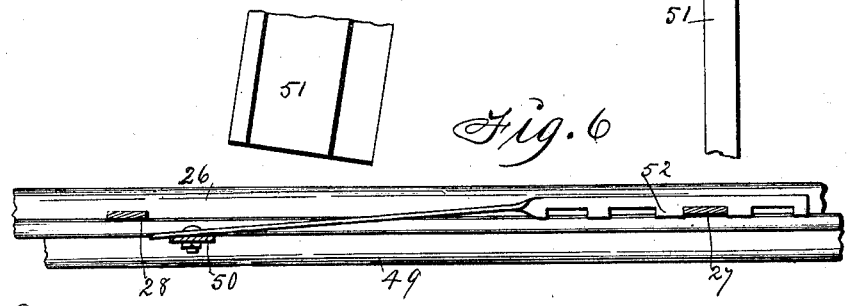

LEWIS P. BLOOD, OF RUNNELLS, IOWA.

RIDING-HARROW.

SPECIFICATION forming part of Letters Patent No. 704,500, dated July 15, 1902.

Application filed September 26, 1901. Serial No. 76,621. (No model.)

*To all whom it may concern:*

Be it known that I, LEWIS P. BLOOD, a citizen of the United States, residing at Runnells, in the county of Polk and State of Iowa, have invented a new and useful Riding-Harrow, of which the following is a specification.

My object is to facilitate the adjustment and operation of harrows by a person seated on the carriage to which the harrow-sections are adjustably connected as required to make the harrows operative and inoperative at pleasure while the carriage is advanced across a field or from one place to another.

My invention consists in forming and combining harrow-sections to adapt them to admit carriage-wheels to travel between the sections, to form tooth-bearing bars and pivot teeth to them so the teeth can be set at any angle desired for practical use and made inoperative by folding them into grooves in the bars in runners connected with harrow-sections for supporting and advancing the sections when elevated into vertical planes at the sides of the carriage-wheels, in a carriage adapted for combining and operating harrow-sections between the carriage-wheels and also outside of the carriage-wheels, in combining mechanism with the carriage and the harrow-sections for adjusting and suspending the harrow-sections by means of levers at the sides of the driver's seat, and in combining the harrow-sections and the carriage with a drag-bar, all as hereinafter set forth, pointed out in my claims, and illustrated in the accompanying drawings, in which—

Figure 1 is a top view showing the forms and relative positions of the different parts. Fig. 2 is a rear elevation and shows one of the harrow-sections suspended in an inoperative position and the mating section hinged thereto in a perpendicular plane and supported upon runners fixed thereto as required in advancing from one field to another and also as required for passing through gateways narrower than the width of the harrow when all the sections extend in horizontal planes. Fig. 3 is an enlarged detail view showing the construction, arrangement, and combination of the lever, pawl, and rack with the axle. Fig. 4 is an enlarged side view of parts of teeth-bearing bars adjustably connected. Fig. 5 is an enlarged transverse sectional view of the teeth-bearing bars made of channel-iron. Fig. 6 is an enlarged detail view showing how the slidable teeth-bearing bars and the teeth are retained in locked position in the harrow-sections.

The numeral 10 designates the carriage-axle, and 11 and 12 the traction-wheels on the ends of the axle. The axle is preferably made of channel-iron and portions utilized for placing a wrench and other tools therein. Covers 13 are fitted on the portions that serve as tool-boxes. V-shaped frames 14 and 15, made of flat bar-iron, as shown in Fig. 1, are fixed to the end portions of the axle 10 in any suitable way to extend forward and terminate in eyes 16, that adapt them to be pivotally connected with a drag-bar 17 by means of clevises 18 and eyebolts 19. A doubletree 20 is connected with the drag-bar 17 as shown in Fig. 1 or in any suitable way.

A driver's seat 21 is fixed to the center of the axle 10, and a foot-rest 22 is fixed to the frames 14 and 15.

Metal frames 23 and 24 are fixed to the end portions of the axle 10 to project vertically and to serve as means for connecting harrow-sections therewith and also hand-levers and devices for adjusting and controlling the harrow-sections while in operation and elevating and carrying them inoperative. A fender 25 is fixed to the top portions of the frames 23 and 24 to arch upward in front of seat 21 and to serve as a means of protecting a person on the seat from falling forward from the seat.

Four harrow-sections are hinged together and at each side of the carriage and adjustably connected with the fixed frames 23 and 24. The straight tooth-bearing bars 26 of the harrow-sections are made of channel-iron that has flanges at its parallel sides, and flat cross-bars 27, 28, and 29 are fixed to the bars 26 in such a manner that the bars 26 will be parallel to each other in each section and each harrow-section inclined relative to the line of advance when in operation, as shown in Fig. 1. The center cross-bars 28 extend and terminate in hinge members connected by means of U-shaped bolts 30. The end cross-bars 27 also extend and are hinged together in the same way by means of U-shaped bolts 30. The contiguous ends of the harrow-sections thus formed are hinged together by means of hinge members 31, fixed to the cross-bars 29 and hinge members 32 by means of U-shaped bolts 30, as shown in Fig. 1, or in any suitable way, so as to allow the harrow-sections independent vertical motions. Mating flexible harrows each composed of four sections are thus constructed and combined and adapted to be adjustably connected with the carriage in such a manner that they will surround the carriage-wheels and to be adjusted relative to each other and the carriage-wheels by a person on the driver's seat.

The diamond-shaped space thus produced between the four harrow-sections allows a traction-wheel of the carriage to tread the ground within that space, as shown in Fig. 1, and also allows the two harrow-sections on the outside of the wheel to be placed in a vertical plane to be supported and advanced upon the runner 42.

Rock-shafts 33, made of round irons bent double at their centers to produce integral arms 34 and curved at their end portions, are mounted in bearings at the tops of the frames 23 and 24. The curved ends of the rock-shafts terminate in journals 35, to which are pivoted hangers 36, and the lower ends of the hangers are fixed to the U-shaped bolts 30, that connect the ends of the center cross-bars 28 of the harrow-sections. The four harrow-sections at each side of the carriage are thus connected with the carriage by means of the rock-shafts 33, and hand-levers 37 are fulcrumed to the tops of the fixed frames 23 and 24 and pivotally connected with the tops of the arms 34 of the rock-shafts by means of links 38 in such a manner that the rock-shafts can be operated by means of the levers as required for raising and lowering jointly the four harrow-sections suspended from the ends of the rock-shafts.

Curved bars 39 are pivoted to the journals 35 at the ends of the rock-shafts 33 and pivotally connected with the centers of the central bar 26 of the harrow-sections on the insides of the carriage-wheels.

Curved bars 40 are pivotally connected with the central bars 26 of the harrow-sections outside of the carriage-wheels and detachably connected with the central cross-bars 28 of the harrow-sections inside of the carriage-wheels by means of spring-bolts 41 or in any suitable way, so the harrow-sections can be turned inward relative to the carriage and project in vertical planes to travel on runners 42, fixed to the free ends of the inner tooth-bearing bars 26, and when the outside sections are in horizontal positions the inner ends of said bars are pivoted to the journals 35, as shown in Fig. 1.

In the lower ends of the fixed frames 23 and 24 is a rack 43, and 44 is a pawl pivotally connected with the lower end of each lever 37 in such a manner that the pawls will engage the rack as required to lock the levers in fixed positions. Rods 45 are connected with the pawls at their lower ends and at their top ends with handles 46, pivoted to the upper ends of the levers for operating the pawls to lock and unlock the levers as required for thereby raising and lowering the harrow-sections.

Chains 47, fixed to the center of the axle 10 and provided with hooks at their free ends, adapt them to be detachably connected with the cross-bars of the harrow-sections to aid in retaining the harrow-sections elevated and inoperative.

The flanges of the tooth-bearing bars 26 are turned inward to produce bearings for channel-bars 49, that have flanges that overlie the said bearings of the bars 26 and are thus slidably connected to the bars 26. Each bar 26 has a bar 49 thus connected therewith, and the bars 49 in each harrow-section are rigidly connected by cross-bars 50, fixed thereto at their central portions, so they can be moved backward and forward jointly as required to adjust the teeth 51, pivoted in the channel-bars 26. By providing slots in the channel-bars 49 the curved teeth can be extended down through the bars and between rivets fixed in the bars, as shown in Figs. 4 and 5, and by moving the bars 49 relative to the bars 26 the teeth can be set at any angle desired and also folded into the channel-bars 49 to cover and protect the teeth as required to facilitate handling the harrow-sections when not in use.

Spring-bars 52, fixed to the cross-bars 50 and provided with teeth adapted to engage the end cross-bars 27, serve as a means for locking the adjustable channel-bars 49 and the teeth 51 in fixed positions relative to the frames of the harrow-sections composed of the bars 26 and cross-bars fixed thereto.

Each one of the four front harrow-sections has a fixed hinge member 53 and a link 54 hinged to said member in such a manner that by means of the clevises 18 at the center of the drag-bar 17 and clevises 55 on the ends of extensions 56, hinged to the ends of the drag-bar, the harrow-sections are adjustably connected with the drag-bar in such a manner that the harrow-sections on the outsides of the carriage-wheels and the hinged extensions on the end of the drag-bar can be turned upward to be jointly retained in vertical planes, as shown in Fig. 2.

Mud-guards 57 are fixed to the frames 23 and 24 to protect the journals on the ends of the axle and in the hubs of the wheels.

Having thus described the purpose, construction, and operation of my invention, its practical operation will be readily understood by persons familiar with the art to which it pertains, and

What I claim as new, and desire to secure by Letters Patent, is—

1. In a riding-harrow, a carriage-axle, traction-wheels on the ends of the axle, frames extended forward from the end portions of the axle inside of the traction-wheels, a foot-rest fixed to the said frames, a seat fixed to the center of the axle, a drag-bar hinged to the front ends of said frames and hinged extensions at the ends of the drag-bar, arranged and combined to operate in the manner set forth for the purposes stated.

2. In a riding-harrow, a carriage-axle, traction-wheels on the ends of the axle, frames extended forward from the end portions of the axle inside of the traction-wheels, a foot-rest fixed to the said frames, a seat fixed to the center of the axle, a drag-bar hinged to the front ends of said frames, extensions hinged to the ends of the drag-bar and harrow-sections hinged to the drag-bar and to the ends of said extensions, arranged and combined to operate in the manner set forth for the purposes stated.

3. In a riding-harrow, a carriage-axle, a drag-bar connected with the axle, hinged extensions on the ends of the drag-bar, traction-wheels on the ends of the axle, frames fixed to the end portions of the axle inside of the traction-wheels to project upward, curved rock-shafts in bearings fixed to said frames, arms at the centers of said rock-shafts and harrow-sections connected with the ends of the rock-shafts and the ends of the drag-bar, arranged and combined to operate in the manner set forth for the purposes stated.

4. In a riding-harrow, a carriage-axle, traction-wheels on the ends of the axle, frames fixed to the axle to project forward, a drag-bar connected with the free ends of said frame, hinged extensions on the ends of the drag-bar, frames fixed to the end portions of the axle inside of the traction-wheels to project upward, curved rock-shafts in bearings fixed to said frames, arms at the centers of said rock-shafts, harrow-sections connected with the ends of the rock-shafts and the drag-bar, hand-levers fulcrumed to said frames and connected with the arms of the rock-shafts, arranged and combined to operate in the manner set forth for the purposes stated.

5. In a riding-harrow, a carriage-axle, traction-wheels on the ends of the axle, frames fixed to the axle to support a drag-bar, a drag-bar connected with said frame, hinged extensions at the ends of the drag-bar, frames fixed to the end portions of the axle inside of the traction-wheels to project upward, curved rock-shafts in bearings fixed to said frames, arms at the centers of said rock-shafts and harrow-sections connected with the ends of the rock-shafts, hand-levers fulcrumed to said frames and connected with the arms of the rock-shafts and means for locking the levers to the axle, arranged and combined to operate in the manner set forth for the purposes stated.

6. In a riding-harrow, a carriage-axle, traction-wheels on the ends of the axle, frames fixed to the axle to project forward, a drag-bar attached to the ends of said frame, extensions hinged to the end of the drag-bar, frames fixed to the end portions of the axle inside of the traction-wheels to project upward, curved rock-shafts in bearings fixed to said frames, arms at the centers of said rock-shafts and harrow-sections connected with the ends of the rock-shafts, hand-levers fulcrumed to said frames and connected with the arms of the rock-shafts, means for locking the levers to the axle, four harrow-sections hinged together in inclined positions relative to each other and the traction-wheels, two of them inside and two of them outside of said wheels, runners on the rear ends of the outside rear sections and runners on the front ends of the outside front sections, hangers on the ends of the arched rock-shafts hinged to extensions of cross-bars at the central portions of the harrow-sections and curved arms pivotally connected with the journals on the ends of the rock-shafts and the central portions of the center bars of the harrow-sections, arranged and combined to operate in the manner set forth for the purposes stated.

7. A riding-harrow comprising a carriage-axle, wheels on the ends of the axle, frames fixed to the end portions to extend forward, a seat on the center of the axle, a drag-bar connected with the front ends of said frames, extensions hinged to the ends of the drag-bar, frames fixed to the end portions of the axle to project upward, curved rock-shafts in bearings fixed to the said fixed frames that project upward, arms at the centers of the rock-shafts, hand-levers fulcrumed to the frames that project upward from the axle, links connecting the arms of the rock-shafts with the levers, means for locking the levers, four harrow-sections hinged together in inclined positions relative to each other and the traction-wheels of the carriage, two on the inside and two on the outside of each wheel, hangers on the ends of the arched rock-shafts hinged at their lower ends to harrow-sections, curved arms pivotally connected with the ends of the rock-shafts and cross-bars of the harrow-sections that are hinged together, means for retaining the harrow-sections on the outsides of the carriage-wheels in vertical planes, means for hinging the front ends of the front and inner harrow-sections to the drag-bar, means for connecting the front and outer harrow-sections to the hinged extensions at the ends of the drag-bar, and a driver's seat at the center of the carriage-axle midway between the said levers, all arranged and combined to operate in the manner set forth for the purposes stated.

LEWIS P. BLOOD.

Witnesses:
IRA N. BLOOD,
THOMAS G. ORWIG.